3,709,900
4,5-DICYANO-2H-IMIDAZOLES
Donald Ray Hartter, Wilmington, Del., assignor to E. I. du Pont de Nemours and Company, Wilmington, Del.
No Drawing. Filed Jan. 14, 1971, Ser. No. 106,573
Int. Cl. C07d 49/36
U.S. Cl. 260—309      7 Claims

ABSTRACT OF THE DISCLOSURE

Diiminosuccinonitrile reacts with aldehydes to give 2-substituted-4,5-dicyanoimidazoles and with methyl ketones to give 2-methyl-2-substituted-4,5-dicyano-2H-imidazoles in the presence of an acid catalyst. Acetals can be employed in place of the ketones or aldehydes in this process. The 2-substituted-4,5-dicyanoimidazoles are known compounds which are useful as chemical intermediates. The 2-methyl-2-alkyl-4,5-dicyano-2H-imidazoles are useful in protecting plants from soil fungi.

FIELD OF THE INVENTION

This invention relates to a process of making 4,5-dicyanoimidazole derivatives and to certain novel substituted 4,5-dicyanoimidazoles which are useful in protecting plants from the attack of soil fungi.

SUMMARY OF THE INVENTION

This invention involves the reaction of diiminosuccinonitrile, in the presence of an acid catalyst, with a compound of the formula

                                  I.

in which $R^1$ is H or methyl, $R^2$ is an n-alkyl group of up to 18 carbon atoms or a halogen-substituted derivative of such group; preferably $R^2$ is lower alkyl or lower alkyl having not more than ⅓ of the hydrogen atoms thereof replaced by halogen, and in particular ω-chloro lower alkyl groups. X is oxygen, two —$OR^3$ groups or a diradical —O—$(CH_2)_n$—O—, in which $R^3$ is an alkyl group of up to 10 carbon atoms, preferably a lower alkyl group and n is 2 or 3.

When the compound of Formula I is a methyl ketone or corresponding ketal, the product is a novel 2-methyl-2-substituted-4,5-dicyano-2H-imidazole of Formula II as shown in the equation

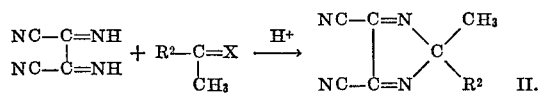

in which $R^2$ and X are defined as above.

These compounds are effective in protecting plants from the attack of soil fungi.

When the compound of Formula I is an aldehyde or corresponding acetal, the product is a 2-substituted-4,5-dicyanoimidazole of Formula III, as shown in the equation

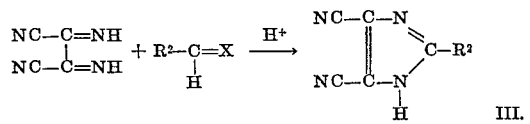

in which $R^2$ and X are defined as above. These compounds are known in the art to be useful intermediates for the synthesis of purines such as caffeine, theobromine, theophylline, etc. as taught in U.S. Pat. 2,534,331.

DETAILED DESCRIPTION OF THE INVENTION

The process of this invention is the reaction of diiminosuccinonitrile with aliphatic aldehydes or methyl ketones, or the correspondng acetals and ketals.

Diiminosuccinonitrile can be prepared by the addition of hydrogen cyanide to cyanogen in the presence of a basic catalyst such as trialklylamine, as described more fully in U.S. application S.N. 707,459 assigned to the assignee of this application, now U.S. 3,564,039.

Acids which catalyze the process of this invention are those characterized by a $pK_a$ of 5 or less, and preferred acids are those with a $pK_a$ of 3 or less. This includes common mineral acids such as hydrochloric acid, sulfuric acid, phosphoric acid, and the like, as well as the stronger organic acids such as oxalic acid, trifluoroacetic acid, trichloroacetic acid, p-toluenesulfonic acid, and the like. In general, the lower the $pK_a$ of the acid, the better catalytic effect although weaker acids are operable and may be preferred under special circumstances. The acid catalyst should be present in an amount at least 0.01% based on the weight of diiminosuccinonitrile. There is no upper limit on the catalyst concentration since, as shown in Example 7, an excess of the acid can serve as a reaction medium.

No additional catalyst action is essential in the process of this invention. However, as shown in the examples below, the optional addition of diaminomaleonitrile in amounts up to 20% by weight of the diiminosuccinonitrile may serve as an additional catalyst.

No added reaction medium is required since the process can be made to take place neat when diiminosuccinonitrile, a compound of Formula I, and an acid catalyst are brought together. To provide for dissipation of the heat of reaction and to improve yields of product, it is preferable to carry out the reaction in the presence of an aprotic organic liquid as a reaction medium. Thus, there may be employed nitriles, such as acetonitrile and benzonitrile, ethers such as dimethyl ether, diethyl ether, tetrahydrofuran, dioxane, and the like, and hydrocarbons such as hexane, benzene, toluene, and the like.

When water is formed in the reaction, e.g., when operating with a compound of Formula I, in which X is oxygen, yields are improved if provision is made for water removal. This may be done by adding a water absorbent such as a dehydrated zeolite, or by employing a water-immiscible reaction medium such as benzene and removing water continuously by azeotropic distillation.

The molecular proportions of diiminosuccinonitrile to the compound of Formula I, which may be brought together in the presence of an acid catalyst to carry out the process of this invention, is not limited since any proportions employed will yield at least some of the 2H-imidazole or imidazole product. For practical purposes, it is preferred to employ the reactants in molar proportions in the range from 10:1 to 1:100, respectively.

Temperatures in the range from —20 to +150° C. may be employed in the reaction. Within this range the several variables in the compounds of Formula I have correspondingly preferred ranges where the yields are best. For example, when the compound of Formula I is a methyl ketone, temperatures in the range from 30 to 120° C. are preferred. When the compound is a ketal, temperatures in the range from 0° to 120° C. are preferred. When the compound is an aldehyde, temperatures in the range of 50 to 120° C. are preferred. When the compound is an acetal, temperatures in the range from —20 to +20° C. are preferred.

Pressure is not a critical variable in the process of this invention. Pressures above and below atmospheric pressure may be used, atmospheric pressure being preferred for convenience. Batch or continuous procedures are both suitable for carrying out the reaction.

The imidazole or 2H-imidazole products are recovered from the reaction mixture by known means such as by evaporation, crystallization, distillation, chromatography, and the like. When desired, the products may be purified by known means such as recrystallization, sublimation, and the like.

The 2H-imidazoles of Formula II are colorless, crystalline compounds, all of which are useful as fungicides. This is illustrated in the examples below. The use of the compounds as fungicides, as well as formulations for applying them in this use, are important aspects of this invention.

The compounds of Formula II provide a method for protecting plants from the destructive effects of soil fungi. Examples of these fungi are: Pythium spp., Rhizoctonia spp., Fusarium spp., Phytophthora spp., Sclerotium spp., Plasmodiophora spp., Aphanomyces spp., *Phymatotrichum omnivorum*, and *Thielaviopsis basicola*.

Soil fungi are extremely prevalent and attack almost all living plants. They attack the seed, root and lower stem area of the plants, in some cases causing root rot or wilt, and in other cases causing death of the plant. These diseases are known throughout the world, attacking such crops as cotton, beans, corn, cereal crops, grasses, sugarcane, sorghum, tobacco, sugar beets, potatoes, tomatoes, cucumbers, squash, watermelons, cantaloupes and other vegetable crops. Ornamentals and tree crops are also attacked.

Soil type, drainage, fertility, and root damage from nematodes and insects influence the incidence and damage from fungus diseases. The development of root rot is favored by such factors as tightly compacted fine soils, high nitrogen in relation to phosphate, continuous cropping of susceptible species, high moisture and cool weather especially during germination and the early seedling stage.

While knowledge of these factors aids in preventing damage from soil fungi, growers have turned increasingly to chemical fungicides to aid them in obtaining good stands of healthy plants which produce high yields. Several soil fungicides are already available to the grower, but each of them, because of their own natural characteristics, have certain drawbacks which preclude their use as a panacea. Additional soil fungicides are needed to help fill the growers continued broadening needs.

The compounds of Formula II will be applied in a variety of formulations, including wettable powders, dusts, suspensions, solutions, granules, pellets, etc. High strength compositions may also be prepared for use by local formulations in further processing.

These formulations will include one or more compounds of Formula II and can include surface-active agents, solid or liquid diluents and other materials as required to produce the desired formulation.

The surface-active agents act as wetting and dispersing agents which assist dispersion of the active material in the spray. The surfactants can include such anionic, nonionic and cationic agents as have been used heretofore in pesticidal compositions of similar type. A detailed list of such agents may be found in "Detergents and Emulsifiers Annual," (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate. Among the non-ionic surfactants, preferred ones include alkylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates, methylcellulose, polyvinyl alcohol and the like.

Surfactants are present in compositions of this invention in amounts up to about 20% weight based on the total weight of the resulting composition. When larger amounts of surfactant are desired, mixing in the spray tank is usually preferable for convenience.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as synthetic fine silica, calcium phosphate, sodium silicoaluminate, and sulfur. In general, storage stability will be best when the system has a near neutral pH and has a low level of moisture. The choice of diluents will then depend on the physical properties and shelf-life desired. The compositions are made by thoroughly blending the active ingredient with the diluent and other additives. Usually a grinding step, as in a hammer mill or fluid energy mill, is included. The particles in dust and powder preparations are preferably less than 50 microns in average diameter. With those compounds which are most highly water insoluble, improved activity may be obtained with still finer grinding.

Preferred wettable powder formulations will contain 40% or more active ingredient together with sufficient surfactant and inert diluent to permit dispersion in water for spray application. Compositions intended for dust application will generally contain less than 50% active ingredient.

Powdered compositions can be converted to granules by adding a liquid, treating mechanically, and usually, drying. Mechanical devices such as granulating pans, mixers and extruders can be used. Compaction devices can be used even without a liquid in the mixture. Water soluble binders, such as inorganic salts, urea, ligninsulfonates, methyl cellulose, and the like, can be included in these particulate formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants may also be included in formulations of the latter type.

Suspension formulations can be made in water, or in organic solvents, or in mixtures of water and water-miscible organic solvents in which the active ingredient has a solubility under about 0.1%. The preparations usually include, in addition to the active ingredient and liquid carrier, surfactants, viscosity control agents, antimicrobial agents and other modifiers. They are prepared by grinding the components in a sand mill or pebble mill preferably until the average particle size is under 20 microns. Hydrocarbon and other flammable carriers should have boiling points above about 125° C. for safety in handling. Suspensions in hydrocarbons are suitable for extension in oils and, by inclusion of a suitable emulsifying agent, may also be made sprayable from water.

Organic liquids suitable for preparation of solutions, suspensions and emulsifiable concentrates of the compounds of this invention include alcohols, glycols, cellosolves, carbitols, ketones, ethers, esters, sulfamides, amides, sulfones and sulfoxides, paraffinic hydrocarbons, aromatic hydrocarbons and halogenated hydrocarbons. Choice of a liquid is dictated by the solubility of the active compound to be used and whether a suspension or solution is desired.

All compositions intended for spray use can contain minor amounts of additives to reduce foam, inhibit corrosion, prevent claying, reduce caking, etc., as the conditions of use may dictate. The conditions of need for and use of such additives are generally known in the art.

The compounds of Formula II may be applied as broadcast or band treatments either prior to or at planting time. They may also be applied as a side-dress to living plants on the surface, or shanked or drenched into the soil. When applied in a band they may be soil-incorporated by rotovation. An alternative and very useful band treatment consists of spraying, dusting or sprinkling granules or pellets into the open furrow either just prior to or just following seed placement, and then closing the furrow. Generally, the more evenly the material is applied, the more uniformly it will protect the plants against the fungi. For broadcast or soil-drench treatments the dosage generally varies from 1–100 kg./ha. Preferred for these treatments is 5–30 kg./ha. When applied as a band or in-furrow treatment 0.1–10.0 kg./9000 m. of row is generally satisfactory. Preferred is 0.5–5.0 kg./9000 m. of row. Compounds used in this invention can also be used to treat seeds either in the conventional sense, in hopper box treatments, or as a constituent in the substances used to pelletize seeds. When used as seed treatments, quantities of from 100 to 2000 gr. of active ingredient per 100 kg. of seed give sufficient protection from soil fungi. A preferred rate combining both excellent protection and low cost is from 300–600 gr. of active ingredient per 100 kg. of seed.

The dosage required depends on the severity of the fungus infection, the area treated, the type and composition of the soil, soil temperature, moisture content, and many other variables.

The compounds of Formula II can be used alone or in combination with other soil pesticides, depending upon the problems involved and the result desired. In general these other pesticides may be used in the ratios of from 1:50 to 50:1 based on the compounds of Formula II. Where soil insects are a problem, insecticides may be used simultaneously in order to save the time and effort involved in making two separate applications. The insecticide formulation may be added to the formulations of this invention or the insecticide may be formulated directly with these compounds. The same applies for nematicides. Insecticides and nematicides that may be used include:

| | |
|---|---|
| Diazinon | O,O-diethyl-O-(2-isopropyl-4-methyl-6-pyrimidyl)phosphorothioate. |
| Disulfoton | O,O-diethyl S-2-(ethylthio)ethylphosphorodithioate (Di-Syston®). |
| Furadan® | 2,3-dihydro-2,2-dimethylbenzofuranyl-7-N-methylcarbamate. |
| Bux® | m-(1-methylbutyl)phenylmethylcarbamate [mixture with approximately 4:1 proportions of m-(1-ethylpropyl)-phenylmethylcarbamate]. |
| Phorate | O,O-diethyl S-(ethylthio)methyl-phosphorodithioate. |
| Du Pont 1410 | S-methyl 1-(dimethylcarbamoyl)-N-[(methylcarbamoyl)oxy]thioformimidate. |
| Methomyl | S-methyl N-(methylcarbamoyloxy)-thioacetimidate. |

In order to obtain broader spectrum fungicidal activity where this is necessary or desirable, other fungicides may be added before or at the time of application of the compounds of Formula II. Rates are the same as for insecticides. These may include:

| | |
|---|---|
| Benlate® | 1-butylcarbamoyl - 2 - benzimidazolecarbamic acid, methyl ester. |
| PCNB | Pentachloronitrobenzene. |
| Vitavax® | 5,6-dihydro-2-methyl - 1,4 - oxathiin-3-carboxanilide. |
| Captan® | N-trichloromethylthiophthalimide. |
| Manzate® | Ethylenebisdithiocarbamic acid, manganese salt. |

SPECIFIC EMBODIMENTS OF THE INVENTION

The following examples are provided to illustrate the process of this invention, the products obtained thereby and the use of certain of these products as fungicides. In these examples, parts and percentages are by weight unless otherwise stated. These examples should not, however, be construed as fully delineating the scope of this discovery.

EXAMPLE 1

2,2-dimethyl-4,5-dicyano-2H-imidazole

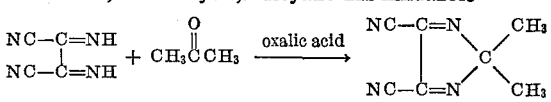

A mixture of 1.0 g. of diiminosuccinonitrile, 100 ml. of acetone and 0.2 g. of oxalic acid was heated at reflux for 48 hours. The product was treated with activated carbon, filtered and evaporated to yield a viscous oil. The oil was pre-absorbed on silica gel and chromatographed by elution with carbon tetrachloride to obtain 0.2 g. of 2,2-dimethyl-4,5-dicyano-2H-imidazole in the form of a white crystalline solid.

EXAMPLE 2

2,2-dimethyl-4,5-dicyano-2H-imidazole

A mixture of 100 g. of diiminosuccinonitrile, 10 g. of diaminomaleonitrile, 10 g. of oxalic acid, 200 g. of porous $Na_{12}(AlO_2)_{12}(SiO_2)_{12}$ (Linde Molecular Sieve Type 4A) and 2500 ml. of acetone was refluxed for 48 hours, filtered, preabsorbed on 400 g. of silica gel and chromatographed. Elution with carbon tetrachloride and recrystallization from benzene gave 90.5 g. (65.6% yield) of 2,2-dimethyl-4,5-dicyano-2H-imidazole in the form of white needles, M.P. 139–140° C.

EXAMPLE 3

To a solution of 10 g. (0.095 mole) of diiminosuccinonitrile and 21 g. (0.20 mole) of 2,2-dimethoxypropane in 250 ml. of tetrahydrofuran was added 10 drops of concentrated $H_2SO_4$. Over approximately 3 minutes the temperature rose from 24° C. to 36° C. The resulting solution was stirred for 3 days at room temperature and then stripped to dryness to give a white solid. Recrystallization from benzene gave 10.7 g. (77% yield) of 2,2-dimethyl-4,5-dicyano-2H-imidazole as white crystals.

2,2-dimethyl-4,5-dicyano-2H-imidazole, prepared as above, had the following characteristics:

Infrared absorption: 3010, 2960, 2880 cm.$^{-1}$ (C—H); 2250 cm.$^{-1}$ (C≡N); 1600, 1540 cm.$^{-1}$ (C=N); 1375, 1355 cm.$^{-1}$ ($H_3C$—C—$CH_3$).

UV: $\lambda_{max.}^{CH_3CN}$ 215 m$\mu$ ($\epsilon$ 5,270), 282 m$\mu$ ($\epsilon$ 26)

Nuclear magnetic resonance: acetone-$d_6$, 8.42$\tau$ (s.).

High resolution mass spectroscopy: molecular ion, measured, m/e 146.0588; calcd. m/e for $C_7H_6N_4$, 146.0592.

Analysis.—Calcd. for $C_7H_6N_4$ (percent): C, 57.52; H, 4.14; N, 38.34. Found (percent): C, 57.28, 57.46; H, 4.26, 4.45; N, 38.28, 38.42.

EXAMPLE 4

A mixture of 25 g. (0.236 mole) of diiminosuccinonitrile, 2 g. of anhydrous oxalic acid, 2 g. of diaminomaleonitrile, 250 ml. of 2-butanone and 300 ml. of benzene was stirred at reflux for 18 hours after which time the theoretical quantity of water (4.2 ml.) had collected in a Dean-Stark trap. The reaction solution was filtered and evaporated to give a viscous oil which was preabsorbed on silica gel and chromatographed. Elution with $CCl_4$ removed 2-methyl-2-ethyl-4,5-dicyano-2H-imidazole, which was recrystallized from $CCl_4$, 7.35 g. (20% yield), white needles, M.P. 94–95° C.

2-methyl-2-ethyl-4,5-dicyano - 2H - imidazole, prepared as above, had the following characteristics:

Infrared absorption: 2990, 2960, 2890 cm.$^{-1}$ (C—H); 2250 cm.$^{-1}$ (C≡N); 1595, 1540 cm.$^{-1}$ (C=N); 1370 cm.$^{-1}$ (C—CH$_3$).

UV: $\lambda_{max.}^{CH_3CN}$ 221 m$\mu$ ($\epsilon$ 5,640); 280 m$\mu$ ($\epsilon$ 29)

Nuclear magnetic resonance: acetone-$d_6$ 9.10$\tau$ (t, J=7.5 Hz., 3H); 8.43$\tau$ (s., 3H); 7.79$\tau$ (p.=7.5 Hz., 2H).

*Analysis.*—Calcd. for C$_8$H$_8$N$_4$ percent): C, 59.98; H, 5.03; N, 34.98. Found (percent): C, 59.66, 59.77; H, 5.16, 4.88; N, 34.79, 35.12.

EXAMPLE 5

Diiminosuccinonitrile (5.4 g., 0.051 mole) was suspended in 150 ml. of benzene containing 4.7 g. (0.050 mole) of chloropropanone and 50 mg. of p-toluenesulfonic acid. This mixture was stirred at reflux for 3 hours, 50 ml. of CH$_3$CN was added and reflux was continued for 3 days. The solution was preabsorbed on silica gel and chromatographed. Elution with benzene removed 0.50 g. (5.5%) of 2-methyl-2-chloromethyl-4,5-dicyano-2H-imidazole. Recrystallization from CCl$_4$ gave white needles, M.P. 108–109° C.

Infrared absorption: 2250 cm.$^{-1}$ (C≡N); 1540 cm.$^{-1}$ (C=N).

*Analysis.*—Calcd. for C$_7$H$_5$N$_4$Cl (percent): C, 46.29; H, 2.78; N, 30.85; Cl, 19.53. Found (percent): C, 46.44, 46.79; H, 2.86, 2.86; N, 31.97, 32.31; Cl, 18.77, 18.70.

EXAMPLE 6

2-methyl-2-propyl-4,5-dicyano-2H-imidazole

A solution of 26.0 g. (0.246 mole) of diiminosuccinonitrile, 2 g. of anhydrous oxalic acid, 2 g. of diaminomaleonitrile, 200 ml. of 2-pentanone and 300 ml. of benzene was refluxed for 14 hours under a Dean-Stark trap. The resulting dark solution was stripped to dryness and chromatographed on silica gel. Elution with petroleum ether gave 7.6 g. (17.9%) of 2-methyl-2-propyl-4,5-dicyano-2H-imidazole as pure white needles, M.P. 90–91° C.

Infrared absorption: 2235 cm.$^{-1}$ (C≡N); 1595, 1540 cm.$^{-1}$ (C=N).

UV: $\lambda_{max.}^{CH_3CN}$ 225 m$\mu$ ($\epsilon$ 5,400)

Nuclear magnetic resonance: CDCl$_3$ 9.3–8.6$\tau$ (m, 5H); 8.40$\tau$ (s, 3H); 8.13–7.79$\tau$ (m. 2H).

*Analysis.*—Calcd. for C$_9$H$_{10}$N$_4$ (percent): C, 62.05; H, 5.79; N, 32.17. Found (percent): C, 61.70, 61.82; H, 5.80, 5.91; N, 32.38, 32.53.

EXAMPLE 7

2-methyl-4,5-dicyanoimidazole

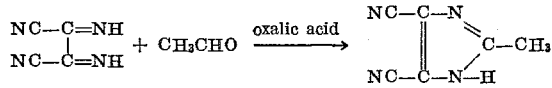

A solution of 20 g. (0.19 mole) of diiminosuccinonitrile, 4.0 g. (0.037 mole) of diaminomaleonitrile, 2 g. of anhydrous oxalic acid and 25 g. of acetaldehyde in 500 ml. of CH$_3$CN was stirred at reflux for 30 hours. The resulting solution was filtered, preabsorbed on silica gel and chromatographed. Elution and recrystallization with CH$_2$Cl$_2$ gave 5.18 g. (0.039 mole, 20.8% yield) of 2-methyl-4,5-dicyanoimidazole as white prisms, M.P. 224–226° C.

Infrared absorption: 3300–2500 cm.$^{-1}$ (CH/NH); 2250 cm$^{-1}$ (C≡N); 1590, 1520 cm.$^{-1}$ (C=C, C=N).

UV: $\lambda_{max.}^{CH_3CN}$ 252.5 m$\mu$ ($\epsilon$ 10,900)

*Analysis.*—Calcd. for C$_6$H$_4$N$_4$ (percent): C, 54.54; H, 3.05; N, 42.11. Found (percent): C, 54.17, 54.17; H, 2.93, 2.83; N, 42.48, 42.73.

EXAMPLE 8

To a solution of 5.3 g. (0.05 mole) of diiminosuccinonitrile in 50 ml. of trifluoroacetic acid at 5° C. was added dropwise over 0.5 hour 9.0 g. (0.10 mole) of acetaldehyde dimethyl acetal. The resulting dark brown solution was allowed to warm to room temperature and stirred for 18 hours. The reaction mixture was stripped to dryness and chromatographed to give 1.73 g. (26.2% yield) of 2-methyl-4,5-dicyanoimidazole as white crystals.

When the ketones shown in the "Ketone" column of Table I below are substituted for 2-butanone in the procedure of Example 4, the 2H-imidazoles shown in the "Product" column are obtained.

TABLE I

| Item | Ketone | Product |
|---|---|---|
| 1 | Methyl n-hexyl ketone. | 2-methyl-2-hexyl-4,5-dicyano-2H-imidazole. |
| 2 | Methyl n-decyl ketone. | 2-methyl-2-decyl-4,5-dicyano-2H-imidazole. |
| 3 | Methyl n-octadecyl ketone. | 2-methyl-2-octadecyl-4,5-dicyano-2H-imidazole. |
| 4 | Methyl α-chloroethyl ketone. | 2-methyl-2-(α-chloroethyl)-4,5-dicyano-2H-imidazole. |
| 5 | Methyl α-bromoethyl ketone. | 2-methyl-2-(α-bromoethyl)-4,5-dicyano-2H-imidazole. |
| 6 | Methyl β-chloroethyl ketone. | 2-methyl-2-(β-chloroethyl)-4,5-dicyano-2H-imidazole. |
| 7 | Methyl α-chloro-n-propyl ketone. | 2-methyl-2-(α-chloropropyl)-4-5-dicyano-2H-imidazole. |
| 8 | Methyl-γ-chloro-n-propyl ketone. | 2-methyl-2-(γ-chloropropyl)-4,5-dicyano-2H-imidazole. |
| 9 | 6-bromo-2-hexanone. | 2-methyl-2-(4-bromobutyl)-4,5-dicyano-2H-imidazole. |
| 10 | 3-bromo-2-heptanone. | 2-methyl-2-(1-bromopentyl)-4,5-dicyano-2H-imidazole. |
| 11 | Fluoromethyl methyl ketone. | 2-methyl-2-(fluoromethyl)-4,5-dicyano-2H-imidazole. |
| 12 | β-Fluoroethyl methyl ketone. | 2-methyl-2-(β-fluoroethyl)-4,5-dicyano-2H-imidazole. |

When the ketals shown in the "Ketal" column of Table II below are substituted for dimethoxypropane in the procedure of Example 3, the 2H-imidazoles shown in the "Product" column are obtained.

TABLE II

| Item | Ketal | Product |
|---|---|---|
| 1 | 2-hexanone dimethyl ketal. | 2-methyl-2-butyl-4,5-dicyano-2H-imidazole. |
| 2 | 2-heptanone ethylene ketal. | 2-methyl-2-pentyl-4,5-dicyano-2H-imidazole. |
| 3 | 1-bromo-3-butanone ethylene ketal. | 2-methyl-2-(α-bromoethyl)-4,5-dicyano-2H-imidazole. |
| 4 | 2-butanone trimethylene ketal. | 2-methyl-2-ethyl-4,5-dicyano-2H-imidazole. |

When the aldehydes shown in the "Aldehyde" column of Table III below are substituted for acetaldehyde in the procedure of Example 7, the imidazoles shown in the "Product" column are obtained.

TABLE III

| Item | Aldehyde | Product |
|---|---|---|
| 1 | Propionaldehyde. | 2-ethyl-4,5-dicyanoimidazole. |
| 2 | n-Octaldehyde. | 2-heptyl-4,5-dicyanoimidazole. |
| 3 | Pentadecanal. | 2-tetradecyl-4,5-dicyanoimidazole. |
| 4 | Stearaldehyde. | 2-heptadecyl-4,5-dicyanoimidazole. |
| 5 | α-Bromoheptaldehyde. | 2-(1-bromohexyl)-4,5-dicyanoimidazole. |
| 6 | 9-chlorononaldehyde | 2-chlorooctyl-4,5-dicyanoimidazole. |

When the acetals shown in the "Acetal" column of Table IV below are substituted for acetaldehyde dimethyl acetal in the procedure of Example 8, the imidazoles shown in the "Product" column are obtained.

TABLE IV

| Item | Acetal | Product |
|---|---|---|
| 1 | n-Butyraldehyde diethyl acetal. | 2-propyl-4,5-dicyanoimidazole. |
| 2 | n-Heptaldehyde diethyl acetal. | 2-hexyl-4,5-dicyanoimidazole. |
| 3 | Bromoacetaldehyde dimethyl acetal. | 2-bromomethyl-4,5-dicyanoimidazole. |
| 4 | 2,3-dichlorobutanal dimethyl acetal. | 2-(1,2-dichloropropyl)-4,5-dicyanoimidazole. |
| 5 | Iodoacetaldehyde diethyl acetal. | 2-iodomethyl-4,5-dicyanoimidazole. |
| 6 | α-Bromo-n-heptaldehyde dimethyl acetal. | 2-(1-bromohexyl)-4,5-dicyanoimidazole. |

EXAMPLE 9

Wettable Powder:  
Part A:

| | Percent |
|---|---|
| 2-ethyl-2-methyl-2H-imidazole-4,5-dicarbonitrile | 50 |
| Dioctyl sodium sulfosuccinate | 1.5 |
| Sodium ligninsulfonate | 3 |
| Low viscosity methyl cellulose | 1.5 |
| Attapulgite | 44 |

The ingredients are thoroughly blended, passed through an air mill to produce an average particle size under 15 microns, reblended, and sifted through a U.S.S. No. 50 sieve (0.3 mm. opening) before packaging. All compounds of Formula II may be formulated in the same manner.

Part B

Two kg. (active) of the above formulation is suspended in 60 liters of water and sprayed into 9000 meters of open furrow. Bean seeds are planted in the treated furrow at the same time that the treatment is made and the furrow closed. The bean seeds, seedlings, and growing plants are protected from attack by Pythium spp. and Rhizoctonia solani, giving a healthy stand of plants which with continued good cultural practices go on to produce a high yield of beans. Bean seeds planted in untreated soil are essentially destroyed by these two organisms. The plants that remain are severely diseased and produce a poor crop.

EXAMPLE 10

High strength concentrate and dust:  
Part A:

| | Percent |
|---|---|
| 2,2-dimethyl-2H-imidazole-4,5-dicarbonitrile | 98.5 |
| Silica aerogel | 0.5 |
| Synthetic amorphous fine silica | 1.0 |

The ingredients are blended and ground in a hammer mill to produce a high strength concentrate essentially all passing U.S.S. No. 50 mesh. This material may then be shipped or formulated in a number of ways. For example, the following 25% dust can be prepared.

| | Percent |
|---|---|
| High strength concentrate | 25.4 |
| Pyrophyllite | 74.6 |

The materials are thoroughly blended and packaged for use.

Part B

A 1 hectare field known to be heavily infested with Sclerotium rolfsii is plowed, disked, and dudsted on a broadcast basis with 120 lbs. of the formulation described above. The field is then rotovated and planted to peanuts. The plants in the treated area emerge and form a healthy stand which, with continued good cultural practices, go on to produce a high yield of peanuts. Plants in an adjacent and similarly infested field which are not treated for control of Sclerotium rolfsii, but which otherwise receive similar treatment, form a thin stand and produce a low yield of poor quality peanuts.

EXAMPLE 11

Solution:  
Part A:

| | Percent |
|---|---|
| 2 - methyl - 2 - propyl - 2H - imidazole - 4,5 - dicarbonitrile | 35 |
| Dimethylformamide | 65 |

The ingredients are combined and stirred to produce a solution suitable for direct application.

Part B

Four liters of this solution is applied as an ultra low volume application to 9000 meters of row. The treatment is tilled into the soil and the area is then planted with tomato plants. The area in which the test is conducted is known to be heavily infested with Rhizoctonia spp., Pythium spp., and Fusarium oxysporum F. lycopersici. Tomato plants in the treated soil are protected from attack by these soil fungi, resulting in healthy plants and an excellent yield of tomatoes. Tomato plants planted in an adjacent untreated similarly infested area show a high incidence of damping-off and wilt, and produce only a low yield.

EXAMPLE 12

Granule:  
Part A:

| | Percent |
|---|---|
| 2 - chloromethyl - 2 - methyl-2H-imidazole-4,5-dicarbonitrile | 10 |
| Sodium sulfate | 12 |
| Calcium ligninsulfonate | 12 |
| Bentonite | 33 |
| Kalinite | 33 |

The ingredients are blended and ground in a hammer mill to pass a U.S.S. No. 50 sieve (0.3 mm. opening). Then one part of water is blended thoroughly with 7 parts of the ground powder. The damp mixture is extruded through a die having 0.125" (approx. 3.2 mm.) openings and the extrusions cut to produce cylindrical pellets shorter than about 0.375" (approx. 9.5 mm.) These are dried, crushed and screened. Granules passing a U.S.S. No. 20 screen (840μ opening) but retained on a U.S.S. No. 40 screen (420μ opening) are retained as product. Oversize is recycled to the crusher and the fines are recycled to the blender.

Part B

The granules described above are sprinkled out and rotovated into a 30 cm. band at the rate of 10 kg. (active) per 9000 meters of row in an area known to be infested with black shank (Phytophthora parasitica). Tobacco seedlings planted in the treated soil are protected from attack by the fungus, thereby resulting in a healthy crop of tobacco. Tobacco plants set out in untreated soil infested with this organism grow poorly and produce a lower yield of lower quality tobacco.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound having the formula

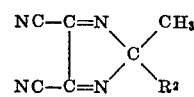

wherein $R^2$ is n-alkyl of up to 18 carbon atoms or lower alkyl substituted with 1 to 2 halogen atoms.

2. A compound of claim 1 in which $R^2$ is lower alkyl.

3. A compound of claim 2 in which lower alkyl is methyl.

4. A compound of claim 2 in which lower alkyl is ethyl.

5. A compound of claim 2 in which lower alkyl is n-propyl.

6. A compound of claim 1 in which $R^2$ is ω-chloro-n-lower alkyl.

7. A compound of claim 6 in which ω-chloro-n-lower alkyl is chloromethyl.

(References on following page)

References Cited

UNITED STATES PATENTS

| | | | |
|---|---|---|---|
| 2,534,331 | 12/1950 | Woodward | 260—309 |
| 3,037,028 | 5/1962 | Green | 260—309 |
| 3,580,925 | 5/1971 | Manos | 260—309 |

OTHER REFERENCES

Asinger et al. (I) Monatsh. Chem., vol. 90, pp. 402–16 (1959).

Asinger et al. (II) Chem. Abst., vol. 65, columns 13,686–7 (1966).

Asinger et al. (III) Chem. Abst., vol. 65, column 20,118 (1966).

Asinger et al. (IV) Monatsh. Chem., vol. 101, pp. 500–7 (1970, March–April).

Bredereck et al., Chem. Abst., vol. 51, columns 4363–4 (1957).

Davidson et al., J. Org. Chem., vol. 2, pp. 319–27 (1938).

Fariña, Chem. Abst., vol. 48, column 4524 (1954).

Weiss, J. Amer. Chem. Soc., vol. 74, pp. 5193–5 (1952).

White et al., Chem. Abst., vol. 61, column 5488 (1964).

Strain, J. Amer. Chem. Soc., vol. 49, pp. 1566–7 relied on (1927).

Hofmann, Imidazole and Its Derivatives, Part I, pp. 33–8, N.Y., Interscience, 1953.

NATALIE TROUSOF, Primary Examiner

U.S. Cl. X.R.

260—465.5 R; 424—273